United States Patent
Bosisio et al.

[11] Patent Number: 5,850,055
[45] Date of Patent: Dec. 15, 1998

[54] HIGH VOLTAGE CABLE

[75] Inventors: Claudio Bosisio, Brembate Sotto; Giulio Tuci, Milan, both of Italy

[73] Assignee: Pirelli Cavi S.p.A., Italy

[21] Appl. No.: 445,352

[22] Filed: May 19, 1995

[30] Foreign Application Priority Data

May 24, 1994 [IT] Italy .................................. MI94A1044

[51] Int. Cl.⁶ .................................................. H01B 9/06
[52] U.S. Cl. ..................................... 174/25 R; 174/120 C
[58] Field of Search ................................... 174/14 R, 24, 174/25 R, 26 R, 120 C, 120 FP

[56] References Cited

U.S. PATENT DOCUMENTS

| | | | |
|---|---|---|---|
| 3,749,812 | 7/1973 | Reynolds et al. | 174/25 R |
| 3,773,965 | 11/1973 | Reynolds | 174/25 G X |
| 3,775,549 | 11/1973 | Matsuda et al. | 174/25 R |
| 4,096,313 | 6/1978 | Fujita et al. | 428/304 X |
| 4,491,684 | 1/1985 | Vecellio | 174/26 R |
| 4,602,121 | 7/1986 | Priaroggia | 174/25 R |
| 4,853,490 | 8/1989 | Bosisio | 174/25 R |
| 4,916,198 | 4/1990 | Scheve et al. | 526/351 |
| 4,994,632 | 2/1991 | Bosisio et al. | 174/121 R |
| 5,254,194 | 10/1993 | Ott et al. | 156/176 X |

OTHER PUBLICATIONS

Patent Abstracts of Japan vol. 4, No. 2 (C–69) 9 Jan. 1980; Abstract of JP–A–54 137 081 (Showa Electric Wire) 24 Oct. 1979 Abstract of JP–A–5 028 833 (Nippon Petrochemicals) 5 Feb. 1993.

Primary Examiner—Kristine Kincaid
Assistant Examiner—Chau N. Nguyen
Attorney, Agent, or Firm—Brooks Haidt Haffner & Delahunty

[57] ABSTRACT

Electrical cable for high and very high voltages includes a plurality of conductors, at least one semiconductive layer, a stratified insulation impregnated with an insulating fluid and an external metal sheath. The insulation is constituted by a paper/polypropylene/paper laminate, wherein polypropylene has been subjected to a treatment such as to allow the laminate to swell up by less than 5% after immersion in decylbenzene at 100° C. for at least 3 days.

13 Claims, 2 Drawing Sheets

HIGH VOLTAGE CABLE

FIELD OF THE INVENTION

The present invention relates to an electrical cable for high and very high voltages wherein the conductors are surrounded by a stratified insulation impregnated with an insulating fluid, said insulation being constituted by a paper/polypropylene/paper laminate.

More in particular, the present invention relates to a cable wherein the central layer of the abovementioned paper/polypropylene/paper laminate is constituted by a radiated polypropylene film.

BACKGROUND

Cables for the transmission of high or very high voltages that comprise a stranded conductor wrapped with a stratified insulation constituted by a paper/polypropylene/paper laminate impregnated with an insulating fluid have been known for a long time. In this type of cable the conductor is preferably of the quoins type or "Milliken" type. In turn, the "Milliken" type conductor is formed by thin conductors, concentrated in sectors insulated from one another, in order to minimize parasitic currents.

The above mentioned known type of cable has, however, the disadvantage that the polypropylene layer undergoes appreciable swelling on the part of the insulating fluid both in the longitudinal and in the transversal direction and, especially, in the vertical direction and this causes several drawbacks, that have an effect the cable's final electrical features.

Attempts have been made in several ways to overcome this drawback:

a) by preimpregnating the polypropylene film (UK-A-1 045 527);

b) by making the conductor wrapper with paper/polypropylene/paper laminates in a humid environment and then drying the wrapped conductor so that the paper shrinkage during the drying step could compensate the polypropylene swelling in the presence of the insulating fluid (U.S. Pat. No. 4,571,357, U.S. Pat. No. 4,602,121);

c) by producing cables having a reduced degree of swelling.

The present invention falls in field c).

As regards swelling in the longitudinal direction the most important drawback derives from the fact that, as opposed to the central layer of polypropylene, the paper forming the laminate's peripheral layers is not subjected to any swelling.

Thus, a relative variation of dimensions takes place in the laminate between the central layer and the peripheral ones and this, in the contact area, gives rise to forces that tend to cause a relative sliding movement between the layers of the laminate.

The consequent possible separations of one layer from the other, even if partial, has extremely serious consequences on the functionality of the cable.

In fact, during bending to which a cable is inevitably subjected during manufacture and laying, sliding stresses originate in the stratified laminate, that acts as the insulation in the cable.

Such sliding stresses, in general, are not harmful when the laminate is integral but, if relative movements are generated between the laminate's different layers, they cause curls, bends, dislocations and breakages in the layers of the laminate when these start separating from one another.

In order to overcome these drawbacks, the U.S. Pat. No. 3,749,812 proposes to extrude the polypropylene film at about 300° C. and to trap it, before it cools, between two cold paper tapes (at room temperature) that are applied under pressure. At room temperature and in the absence of impregnating agent, the external layers of the paper keep the central layer of polypropylene in a state of elastic elongation; for this reason this type of laminate is also know as "pre-stressed" laminate. When it is later placed in the presence of a suitable insulating fluid, it swells up in a controlled manner and it tends to attain a condition of absence of stresses.

Instead, swelling in the vertical direction causes a state of high pressure in the stratified insulation that makes the cable as a whole extremely rigid.

This drawback is particularly serious in Milliken-type cables wherein the low mechanical rigidity of the conductor (formed by thin wires and thus highly flexible) causes the absence of an adequate support for the insulation during bending, jeopardizing its regularity, and making the insulation all the more subject to localized damage.

According to the patent U.S. Pat. No. 3,775,549, swelling is reduced by means of a laminate constituted by a twin-oriented polypropylene film attached to the paper by an adhesive constituted by a polyolefin extruded in the molten state, said polyolefin being polypropylene or a copolymer of polypropylene.

However, the production process of this laminate is quite complex and costly as it involves a number of steps. In fact, it is first of all necessary to extrude a polypropylene film, it then has to be oriented both in the machine direction and in the transversal direction. Lastly, this film is coupled to paper by means of a molten layer of polypropylene or of one of its polymers.

The need is therefore still keenly felt for a paper/polypropylene/paper laminate capable of being impregnated with an insulating fluid without, however, swelling up to any appreciable extent and that can be manufactured in a simple manner and with a high degree of constancy of its mechanical and electrical features.

SUMMARY OF THE INVENTION

It has now been unexpectedly found that these objectives are attained with a paper/polypropylene/paper laminate wherein the central layer is constituted by a polypropylene film radiated with high-energy ionizing radiations.

The reason why radiated polypropylene exhibits these properties has not yet been ascertained.

It has been thought that this property may be linked with the higher degree of crystallinity given that polypropylenes with added chemical nucleants also have a greater tendency to crystallize and they swell up to a lesser extent in the presence of insulating fluids but it has also been seen that this is not sufficient because some of their electrical characteristics (in particular the dissipation factor) become worse.

During the course of the present description and of the claims the expression "high and very high voltages" is used to indicate voltages of 200 kV and up.

The expression "insulating fluid" indicates a fluid, preferably oily, having a very low viscosity (of the order of 5–15 centistocks) and a resistivity of at least 1016 ohm/cm, such as mineral oils, alkyl naphthalenes and alkyl benzenes. Typical examples of insulating fluids described by EP-A- 0 001 494 are decylbenzene, dodecylbenzene, benzyl toluene, dibenzyl toluene, 1-methyl naphthalene, monoisopropyldiphenyl, 1-phenyl-1-(3,4-dimethyl-phenyl)-ethane, 1,2-diphenyl ethane and their mixtures.

The term "laminate" indicates a planar material with a thickness generally ranging from 70 to 300 microns and, preferably, from 70 to 200 microns, obtained by the superimposition of at least two layers of materials, the same or different, made integral one with the other by conventional techniques. Three-layered laminates are preferred because they exhibit a better symmetry under mechanical stresses, providing a behaviour (friction) similar to that of paper tapes. In the case of a paper/polypropylene/paper laminate, the paper is, prevalently or entirely, constituted by cellulose. Each layer of paper is preferably constituted by a single sheet having a maximum thickness of 80 microns, preferably said thickness ranges from 20 to 50 microns. The paper is of the low-density type; typically, it has a maximum density of 0.85 g/cm$^3$. Typically, impermeability to air ranges from $10 \times 10^6$ and $30 \times 10^6$ Emanueli units (G. Trogu, "Comparison between the modified Emanueli Porosimeter and other paper air resistance testers" Technical Association of the Pulp and Paper Industry (TAPPI), vol. 44, No. 10, October 1961, pages 176–182A). The preferred type of paper is an electric-grade cellulose paper 20–50 micron thick, having a density of 0.65–0.75 g/cm$^3$ and an impermeability to air of $10-30 \times 10^6$ Emanueli units. Generally, the thickness of the polypropylene film is equal to 35–70%, preferably to 50–65%, of the laminate's total thickness.

The term "polypropylene" indicates a material selected from the group comprising (a) homopolymers of polypropylene; (b) randomized copolymers of propylene and of an olefin selected from the group comprising ethylene, 1-olefins having 4–10 C and dienes having 4–10 C on condition, however, that when said olefin is ethylene, its maximum polymerized content is about 5% (preferably 4%) by weight, that when said olefin is a 1-olefin having 4–10 C its maximum polymerized content is about 20% (preferably 16%) by weight, and when said olefin is a diene having 4–10 C its maximum polymerized content is about 5% (preferably 4%) by weight; and (c) randomized terpolymers of propylene and olefins selected from the group comprising ethylene and 1-olefins having 4–8 C on condition, however, that when one of said olefins is ethylene, its maximum polymerized content is about 5% (preferably 4%) by weight and that the maximum polymerized content of said 1-olefins having 4–8 C is about 20% (preferably 16%) by weight. 1-olefins having 4–10 C comprise linear or branched 1-olefins having 4–10 C such as, for example, 1-butylene, isobutylene, 1-pentene, 3-methyl-1-butylene, 1-hexene, 3,4-dimethyl-1-butylene, 1-heptene, 3-methyl-1-hexene and such like.

Typical examples of dienes having 4–10 C are: 1,3-butadiene, 1,4-pentadiene, isoprene, 1,5-hexadiene, 2,3-methyl-1,3-hexadiene and such like.

The term "radiated polypropylene" indicates a polypropylene radiated with high-energy ionizing radiations. A suitable type of radiated polypropylene is that described by U.S. Pat. No. 4,916,198. According to said document radiated polypropylene is produced (1) by radiating a linear polypropylene (a) in an environment wherein an active oxygen concentration is created and maintained below about 15% by volume of said environment (b) with a high-energy ionizing radiation in an amount ranging from about 1 and about $1 \times 10^4$ megarad/minute for a time sufficient to cause a substantial quantity of scissions in the chain of said linear polypropylene, insufficient, however, to gel it; (2) by keeping the radiated material in said environment for a time sufficient to form a significant quantity of long ramifications of the chain; and (3) by then treating the radiated material, while it is in said environment, so as to substantially deactivate all the free radicals present in said radiated material.

A first object of the present invention is thus constituted by an electrical cable for high and very high voltages comprising a plurality of conductors, at least one senmiconductive layer, a stratified insulation impregnated with an insulating fluid and an external metal sheath, wherein said insulation is constituted by a paper/polypropylene/paper laminate, characterized in that the central layer of said laminate is constituted by a film of radiated polypropylene.

Preferably, after a heat treatment (infrared rays) at 145° C. for at least 15 seconds, with a negligible heating and cooling rate, or by heating in a vacuum in a pressure vessel for an equivalent time, the paper/polypropylene/paper laminate according to the present invention, whose central layer is constituted by a film of radiated polypropylene, swells up by less than 5% after immersion in decylbenzene at 100° C. under asymptotic conditions (at least 3 days).

Typical example of radiated polypropylene is Profax™ PF 611 (Himont) that is characterized by a melt index, determined according to the ASTM D1238 specification, of 40 dg/min, a density, determined according to the ASTM D792A-2 specification, of 0.902 g/cm$^3$ and a Vicat 95 softening point of 150° C.

According to the above, a second object of the present invention is thus constituted by a paper/polypropylene/paper laminate characterized in that its central layer is constituted by a film of radiated polypropylene.

BRIEF DESCRIPTION OF THE DRAWINGS

The enclosed figures illustrate an embodiment of the cable of the present invention.

DESCRIPTION OF THE PREFERRED EMBODIMENTS

Figure 1:
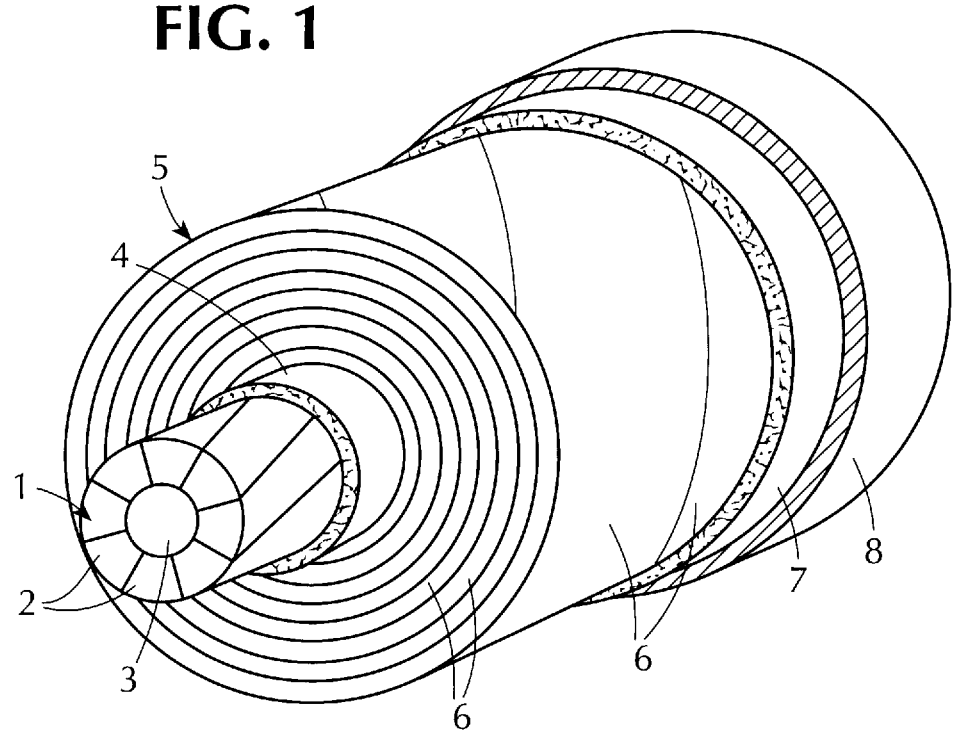
FIG. 1 shows a perspective view of a section of a cable according to the present invention with parts removed in turn to highlight the structure.

The cable represented in FIG. 1 is a fluid-oil single-pole cable according to the present invention.

The cable comprises an electrical conductor 1, formed by a plurality of conductors 2 for example made of copper, that has a duct 3 constituting the duct of the cable's insulating fluid, preferably dodecylbenzene.

The conductors 2 are in the shape of copper quoins or, in Milliken-type cables, they are constituted by a sheaf of copper wires. Around the conductor 1 there is semiconductive layer 4 formed, for example, by turns of semiconductor tapes, for example cellulose paper loaded with semiconductive lampblack.

Around the semiconductive layer 4 there is a stratified insulation 5 formed by turns of tapes 6 of a paper/polypropylene/paper laminate whose central layer is constituted by a film of radiated polypropylene.

Over the stratified insulation 5 there is a semiconductive layer 7 whose structure is identical with that of the semiconductive layer 4 indicated earlier.

A metal sheath 8, for example, made of lead, encloses all the elements of the cable described earlier and every space inside said sheath is filled by the cable's insulating fluid that, in particular, impregnates the stratified insulation 5.

The stratified insulation 5 is formed by turns of tape 6 of a paper/polypropylene/paper laminate whose central layer is constituted by a film of radiated polypropylene.

Figure 2:
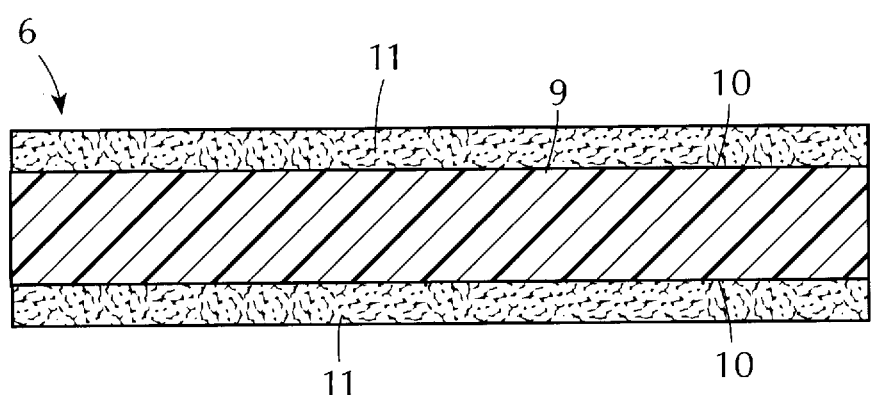
FIG. 2 shows a cross-sectional view of a tape of a laminate with which the stratified insulation of the cable of FIG. 1 is formed.

It is seen in FIG. 2 that the laminate comprises a central layer 9 of radiated polypropylene to whose upper and lower faces 10 respective layers 11 of paper, especially cellulose paper, are constrained.

The stratified insulation 5 comprises from 100 to 300 winding turns of laminate 6 according to the expected electrical voltage.

Before being wrapped, the laminate 6 is preferably preconditioned in an environment at a relative humidity (UR) ranging from 10% to 80%.

During the wrapping step, the laminate's UR ranges preferably from 10% to 80%, even more preferably from 10% to 60%.

After wrapping, the cable is dried in a vacuum (pressure: about 0.002–0.01 millibar; T: about 135° C.) and then impregnated in a tank with an insulating fluid, for example dodecylbenzene.

Impregnation takes place at a temperature ranging from room temperature to about 100° C., typically for 1–2 days.

One of the advantages of the present invention is represented by the fact that impregnation can also be carried out at temperatures higher than 90° C. because, since radiated polypropylene is less swellable than non-radiated polypropylene, it is possible to carry out impregnation at temperatures closer to the cable's maximum operating temperature (about 90° C.) without being penalized by excessive swelling.

In fact, swelling increases with temperature and in the case of non-radiated polypropylene swelling is altogether unacceptable when 90° C. are exceeded. Thus, after the drying treatment at 135° C. and before impregnation, the cable must be "cooled" for a few days, with a consequent cost increase.

But if, on the other hand, impregnation can be carried out at temperatures closer to those of operation the abovementioned drawback is overcome by moving the cable of the present invention, after drying, directly to the impregnation tank, or in any case by cooling the wrapped cabled for a much shorter period.

It should be noted that, if wrapping is carried out under conditions of very high relative humidity (for example, 95%), the paper exhibits an increase in thickness, due to the absorption of humidity, which is subsequently lost during the drying step of the wrapped cable, that thus remains slack.

This can be used to compensate the swelling of the polypropylene impregnated at a temperature close to the cable's operating temperature, so as to obtain at last a cable with no excessive internal pressure; such conditions, however, are unacceptable for staff and equipment used.

After the impregnation step, the cable is coated with a waterproof sheath 8, for example of corrugated aluminium or of lead, and then with an outer plastic sheath (not represented), for example of high-medium- or low-density polyethylene, preferably black in colour and resistant to UV rays.

The following examples can be used to further illustrate the present invention without, however, limiting it in any way.

EXAMPLE 1

Production of a laminate (L1) according to the invention
Materials:
  radiated polypropylene Profax™ PF 611 (Himont),
  electric-grade uncalendered cellulose paper 30 microns thick, having a density of 0.65–0.73 g/cm$^3$ and an impermeability to air of 10–30×10$^6$ Emanueli units.
Equipment:
  The equipment is constituted by a flat-head extruder and by two paper feeding lines at the sides of said extruder.

Each paper feeding line is provided with a drying device (for example, with heated cylinders) and with a device capable of generating a crown effect (U.S. Pat. No. 4,994, 632).

Typically said device is constituted by two electrodes across which an 18 kV alternating voltage is applied at a frequency of 10 KHz.

Moreover, the equipment is provided with a chill roll and with a rubber-coated pressure roll located in front of said chill roll.

The chill roll is cooled by means of the internal circulation of a cooling fluid, typically water at about 15° C. Process:

The process consists essentially in trapping a layer of molten radiated polypropylene between two layers of paper.

The radiated polypropylene extruded at about 250°–310° C. moves downward toward the chill roll that is located below the extruder head, a few centimeters from it.

Before being placed on the chill roll, the molten layer of radiated polypropylene is trapped between the two layers of paper at room temperature.

Thanks to the treatment to which it has been subjected, a substantial number of cellulolse fibrils protrude from the surface of said paper layers and penetrate into the molten mass to facilitate the fastening of the paper to the film of radiated polypropylene.

Proceeding in its path, the laminate moves downward on to the chill roll and passes between this chill roll and the pressure roll.

The pressure exerted by the latter completes the penetration and the fastening of the paper in the radiated polypropylene.

Lastly, the laminate (L1) obtained in this way is made to move to a winding roll.

The laminate has a thickness of 125 microns and the paper layers are embedded for about 10% of their thickness in the central layer of radiated polypropylene 75 microns thick.

EXAMPLE 2

Comparison laminate (L2)

A second laminate has been produced in a similar manner except that, instead of the Profax™ PF 611 a non-radiated and isotactic homopolymer of polypropylene has been used (H30S by HIMONT).

TESTS ON LAMINATES

The properties of the laminates (L1 and L2) thus produced have been compared with those of the following commercial paper/polypropylene/paper laminates:
  L3: CPC-B-125 of Sumitomo Electric Industries Ltd.;
    Total thickness: 125 microns.
    The central layer is constituted by a film of a non-radiated homopolymer of polypropylene about 75 microns thick, with a percentage of weight of polypropylene on the total weight of the laminate of about 60%.

L4: Commercial laminate with a total thickness of 125 microns, 60% by weight of polypropylene, by BICC; Total thickness: 125 microns.

The central layer is constituted by a film of a non-radiated homopolymer of polypropylene about 75 microns thick.

A) SWELLING

Four samples (consisting of bundles of strips 15 mm wide, 100 mm long, for a total thickness equal to about 0.8 mm) were prepared for each laminate L1, L2, L3 and L4.

Laminates L1 and L2 had previously been heated for 16 hours at 135° C.

The thickness of each sample was measured with a thickness gauge that exerts a pressure of 0.2 kg/cm$^2$.

The samples were then immersed in dodecylbenzene at different temperatures. After 30 days the samples were removed from the fluid, dried between two layers of filter paper, and their thickness measured with the abovementioned thickness gauge. The increase in thickness (swelling) was expressed in percentage terms.

TABLE 1

% Swelling (after 30 days)

| Laminate | Temperature of Dodecylbenzene | | |
|---|---|---|---|
|  | 50° C. | 90° C. | 100° C. |
| L1 | 3.8 | 4.3 | 4.4 |
| L2 | 5.5 | 7.5 | 8.6 |
| L3 | 5.5 | 7.0 | 7.4 |
| L4 | 6.8* | >10** | >10** |

(*) after 1 day,
(**) after 6 days.

In the case of the L4 laminate the test was interrupted after 6 days because the paper layers had by then become detached from that of polypropylene thus jeopardizing the laminate's integrity.

B) DISSIPATION FACTOR

The laminates L1 and L2 had previously been heated for 16 hours at 135° C.

The dissipation factor was determined according to the ASTM D 150-92 specification, except that the variants described hereinafter were made.

Four round samples with a diameter of 17 mm were obtained from L1.

A pack (P1) about 0.5 mm thick was then made up with the four samples of L1 (by placing the laminate disks over one another to obtain a pack of the indicated thickness).

The pack (P1) was placed under the electrodes of a test cell of a conventional type and dried in an oven for 24 hours at 135° C. in a vacuum (about 0.01 millibar).

At the end of the drying step, the oven was opened and the cell was allowed to cool to about 100° C.

In the meantime degassed dodecylbezene (4 hours, 60° C., 0.01 millibar) was prepared (600 ml).

P1 was impregnated in a vacuum (0.01 millibar) and the cell was kept at 100° C. for 24 hours.

The oven was opened and the cell was allowed to cool down to room temperature.

Atmospheric pressure was restored in the cell and the measurement of the delta tangent was begun (at 20 KV/mm) first at room temperature and then at 50° C., 80° C., 100° C. and 120° C., taking care to keep the cell at the reading temperature for at least 2 hours.

Proceeding in a similar manner the delta tangent of L2, L3 and L4 was then determined. The results are illustrated in the following Table 2.

TABLE 2

Dissipation factor (20 KV/mm)

| Laminate | Temperature (°C.) | | | | |
|---|---|---|---|---|---|
|  | 19 | 50 | 80 | 100 | 120 |
| L1 | 0.6 | 0.6 | 0.6 | 0.7 | 1.0 |
| L2 | 0.6 | 0.6 | 0.6 | 0.8 | 1.3 |
| L3 | 0.5 | 0.5 | 0.6 | 0.8 | 1.3 |
| L4 | 0.6 | 0.6 | 0.7 | 0.9 | 1.4 |

C) CRYSTALLINITY

One sample of L1 and one sample of L2 were used. The central film of polypropylene was separated mechanically from the two external layers of paper facilitating detachment, where necessary, by wetting with water.

Four samples were obtained from the polypropylene film of L1.

The first of them was heated to 130° C., the second to 140° C., the third to 150° C. and the fourth to 160° C.

In turn, five samples were obtained from the polypropylene film of L2.

The first of them was heated to 120° C., the second to 130° C., the third to 140° C., the fourth to 150° C. and the fifth to 160° C.

The crystallinity of the nine samples was determined with a PHILIPS diffractometer model P.W. 1050 P.W. 1732 arranging the samples on a strip of amorphous silica.

The method used is based on the hypothesis of an arrangement of the twin-phase type of the material, with crystalline domains dispersed in an amorphous matrix.

The diffractogramme of the material (diffracted intensity in relation to the Bragg 2θ angle) can thus be interpreted as being constituted by a contribution of the diffuse type attributable to the amorphous portion and by angularly localized contributions, that is diffraction peaks, attributable to the crystalline portion.

Since the diffracted intensity produced by each phase (quantitatively and separately assessable on the basis of the area of the diffractogramme) is proportional to the corresponding average fraction of the sample under test, the degree of crystallinity xc is calculated as the ratio between the intensity Ic attributable to the crystalline phase and the total intensity (sum of the intensities corresponding to the crystalline phase Ic and to the amorphous phase Ia): $xc=Ic/(Ic+Ia)$.

Figure 3:
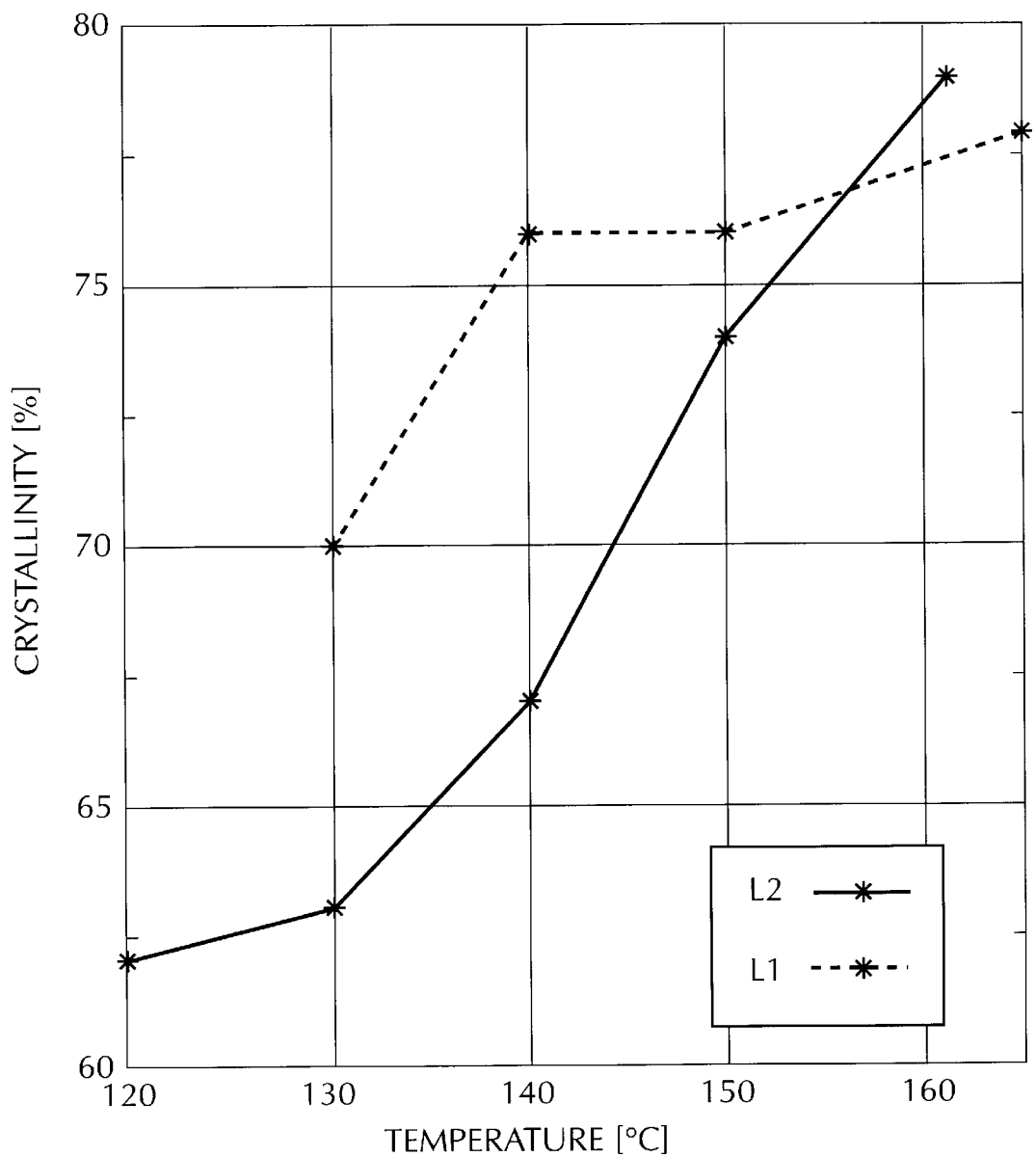
FIG. 3 shows a graph that illustrates the change of the degree of crystallinity, with the change in temperature, of the layer of polypropylene of a laminate according to the present invention (L1) with respect to the layer of polypropylene of a laminate according to the known art (L2).

The wavelength of the radiation was 1.54 angstrom.
The results obtained are illustrated in the graph of FIG 3.

EXAMPLE 3

Comparison cable (C2)

A sufficient quantity of coils of L2 was heated in an oven at about 135° C. and in a vacuum (about 0.01 millibar) for 16 hours.

The coils were then cut to give rolls of tapes with a width suitable for wrapping a cable having a conductor with a cross-section of about 2500 mm$^2$.

The rolls of tapes are then kept in an environment having a relative humidity (U.R.) of about 10% for 4 days.

After being subjected to this treatment, the rolls of tape were used to wrap a Milliken-type cable having a cross-section of about 2500 mm$^2$.

Overall, the wrap with L2 included 180 layers and its thickness was 19.9 mm.

The cable wrapped in this way was placed in a pressure vessel at 135° C., in a vacuum (about 0.01 millibar) for 4 days.

The cable was then allowed to cool down to 50° C. and was kept at this temperature immersed in dodecylbenzene for 3 days.

Lastly, a corrugated aluminium sheath was applied and, over this, a polythene sheath.

EXAMPLE 4

Cable according to the invention (C1)

It was produced in a manner similar to that described for Example 3, except that:

L1 was used instead of L2,

L1 was heated with infrared rays for 15 seconds instead of in an oven at 135° C. in a vacuum (about 0.01 millibar) for 16 hours.

The impregnation of the cable with dodecylbenzene was carried out at 90° C. instead of at 50° C.

The IR heating of the laminate was carried out during the step of rewinding the tape on the coil, before wrapping. NOTE: The heating of the laminate can also be carried out with other methods, in relation to the specific characteristics of the equipment and of the process for the manufacture of the cable or for the production of the laminate.

Such treatment is executed with the object of avoiding or limiting the appearance of shrinkages of the laminate tape in the wrapped cable, that can take place in the subsequent cable manufacturing steps, in particular during its drying, and that can alter its characteristics.

It is felt that such occurrences are linked with structural modifications of the laminate's polymeric material, such as crystallization and such like, and their extent depends both on the temperature at which the heat treatment is carried out (that cannot in any case exceed values at which damage occurs to the layers of paper, indicatively 140° C.–150° C.), and on the type of polymer in use.

For the purposes of the present invention, it is considered that the heating treatment in an oven at 135°–140° C. for 10–20 hours and the IR infrared treatment at about 135° C. for 10–20 seconds produce equivalent results. The person skilled in the art will, in relation to the specific characteristics of the wrapping equipment used, be able to identify the most suitable type of treatment in order to obtain the desired properties.

As an example, the heat treatment can take place on the laminate production line, downstream from the paper/polypropylene/paper coupling, and in such case the infrared ray treatment is felt to be preferable.

As an alternative, the heat treatment can be carried out on the coils of finished laminate, preferably before it is cut into strips. Such treatment can then be carried out in a pressure vessel in a vacuum, or "oven", at 135°–140° C., for a time sufficient so that the entire coil reaches the desired temperature (several hours), or by uncoiling the laminate and causing it to pass under a set of IR lamps, for a time of exposure of a few seconds (since in such case the thermal transitories in the laminate take place in negligible times).

TESTS ON THE CABLE

C) FLEXIBILITY

The bending rigidity of C1 and C2 has been measured on a section of cable 1.8 m long placed horizontally on two supports at a distance of 1.5 m one from the other.

Between the two supports, in the centre, there was a graduated rod suitable for measuring the amount by which the cable dropped.

A steadily increasing load was applied to the centre of the cable and the amount by which the cable dropped was measured.

The results are given in the following Tables 3 and 4.

TABLE 3

Bending Rigidity of Cable C2

| | Load (KN) | | | | |
|---|---|---|---|---|---|
| | 0.2 | 0.4 | 0.6 | 0.8 | 1 |
| Drop (mm) | 2.1 | 5.2 | (11.6) | (32.0) | (50) |

It is felt that values corresponding to loads greater than or equal to 0.6 KN are due to damage to the cable's structure.

TABLE 4

Bending Rigidity of Cable C1

| | Load (KN) | | | | |
|---|---|---|---|---|---|
| | 0.2 | 0.4 | 0.6 | 0.8 | 1 |
| Drop (mm) | 6.8 | 21.0 | 35.8 | 53.0 | 70.5 |

D) INTERNAL PRESSURE BETWEEN THE LAYERS OF THE CABLE

Preparation of the sample.

A section of conductor 1.3 m long was wrapped following the same procedure with which the real cable is wrapped except that in the central area (0.65 m from the ends) 9 laminas were inserted (length, 180 mm; width, 5 mm; thickness, 0.03 mm).

Of these 9 laminas, 3 were inserted near the conductor, 3 half way through the wrap and 3 on the outside.

Method

The sample was dried in a kiln at 140° C. for 48 hours in a vacuum (0.01 millibar) and it was then cooled down to the desired impregnation temperature and impregnated with the insulating fluid.

Once impregnation was completed the force necessary to withdraw the laminas from the insulation was measured.

Tests

These were carried out on two samples of cables C1 and C2 that will be indicated hereinafter with P-C1 and P-C2.

The impregnation temperature was 90° C.

The insulating fluid was dodecylbenzene.

The results are illustrated in the following table.

TABLE 5

| | P-C1 | P-C2 |
|---|---|---|
| Internal pressure (kg/cm$^2$) | 0.4–0.7 | 1.2–1.4 |

E) DISSIPATION FACTOR

This was measured according to the IEC (International Electrotechnical Commission) standard "Tests on oil-filled and gas pressure cables and their accessories", Publication 141-1, second edition (1976).

The results are illustrated in the following Table 6.

TABLE 6

| | Dissipation factor | | | | |
| --- | --- | --- | --- | --- | --- |
| | Temperature °C. | | | | |
| Cable | 19 | 50 | 80 | 100 | 120 |
| C1 ( 5 KV/mm) | 0.05 | 0.05 | 0.05 | 0.07 | 0.10 |
| C1 (10 KV/mm) | 0.05 | 0.05 | 0.05 | 0.07 | 0.10 |
| C1 (15 KV/mm) | 0.05 | 0.05 | 0.07 | 0.07 | 0.15 |
| C1 (20 KV/mm) | 0.05 | 0.05 | 0.07 | 0.07 | 0.15 |
| C2 (5 KV/mm) | 0.05 | 0.05 | 0.05 | 0.10 | 0.30 |
| C2 (10 KV/mm) | 0.05 | 0.05 | 0.05 | 0.30 | 0.80 |
| C2 (15 KV/mm) | 0.05 | 0.05 | 0.10 | 0.80 | 1.80 |
| C2 (20 KV/mm) | 0.05 | 0.05 | 0.30 | 1.50 | >3 |

We claim:

1. An electrical cable for high and very high voltages comprising a plurality of conductors, at least one semiconductive layer, a stratified electrical insulation impregnated with an insulating fluid and an external metal sheath, wherein said insulation is constituted by a paper/polypropylene/paper laminate, wherein said laminate includes a central layer of a film of radiated polypropylene and in the presence of the insulating fluid said laminate swells substantially less than a paper/polypropylene/paper laminate which does not include radiated polypropylene, wherein said laminate swells less than 5% when said laminate has been heat treated at 135° C. with infrared rays for at least 15 seconds and is immersed in decylbenzene at 100° C. for at least 3 days.

2. A cable according to claim 1, characterized in that said radiated polypropylene has a melt index, determined according to the ASTM D1238 specification, of 40 dg/min, a density, determined according to the ASTM D792A-2 specification, of 0.902 g/cm$^3$, and a Vicat 95 softening point of 150° C.

3. A cable according to claim 1, characterized in that said radiated polypropylene has a melt index, determined according to the ASTM D1238 specification, of 40 dg/min.

4. A cable according to claim 3, characterized in that said radiated polypropylene has a density, determined according to the ASTM D792A-2 specification, of 0.902 g/cm$^3$.

5. A cable according to claim 3, characterized in that said radiated polypropylene has a Vicat 95 softening point of 150° C.

6. A high voltage electrical insulation tape comprising a paper/polypropylene/paper laminate, wherein the laminate includes a central layer of a film of radiated polypropylene and in the presence of an insulating fluid said laminate swells substantially less than a paper/polypropylene/paper laminate which does not include radiated polypropylene, wherein said laminate swells less than 5% when said laminate has been heat treated at 135° C. with infrared rays for at least 15 seconds and is immersed in decylbenzene at 100° C. for at least 3 days.

7. The insulation tape according to claim 6, wherein said radiated polypropylene has a melt index, determined according to the ASTM D1238 specification, of 40 dg/min, a density, determined according to the ASTM D792A-2 specification, of 0.902 g/cm$^3$, and a Vicat 95 softening point of 150° C.

8. The insulation tape according to claim 6, wherein said radiated polypropylene has a melt index, determined according to the ASTM D1238 specification, of 40 dg/min.

9. The insulation tape according to claim 8, wherein said radiated polypropylene has a density, determined according to the ASTM D792A-2 specification, of 0.902 g/cm$^3$.

10. The insulation tape according to claim 8, wherein said radiated polypropylene has a Vicat 95 softening point of 150° C.

11. The insulation tape of claim 6, wherein the papers of the laminate are substantially impermeable to air.

12. The insulation tape of claim 6, wherein the papers of the laminate are electric-grade cellulose papers.

13. The insulation tape of claim 6, wherein the papers of the laminate have surfaces facing surfaces of the film of the radiated polypropylene and wherein said surfaces of the paper are bonded substantially throughout their extent to the surfaces of the film.

* * * * *